Dec. 10, 1929.  E. C. MYERS  1,739,323
MOWING MACHINE
Filed Dec. 27, 1920  2 Sheets-Sheet 1
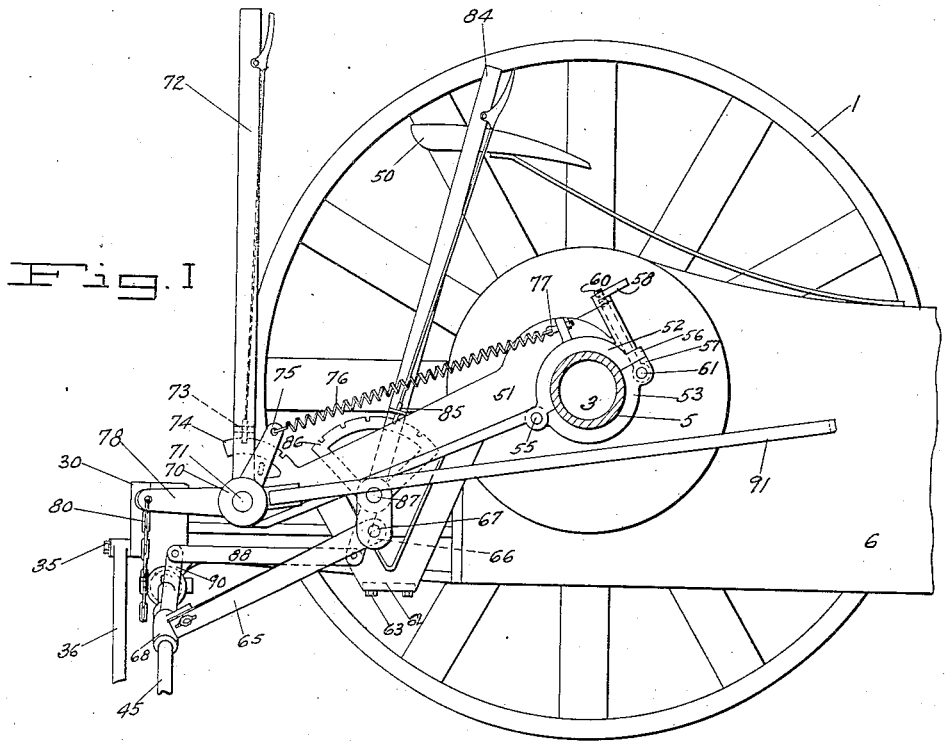
Fig. I
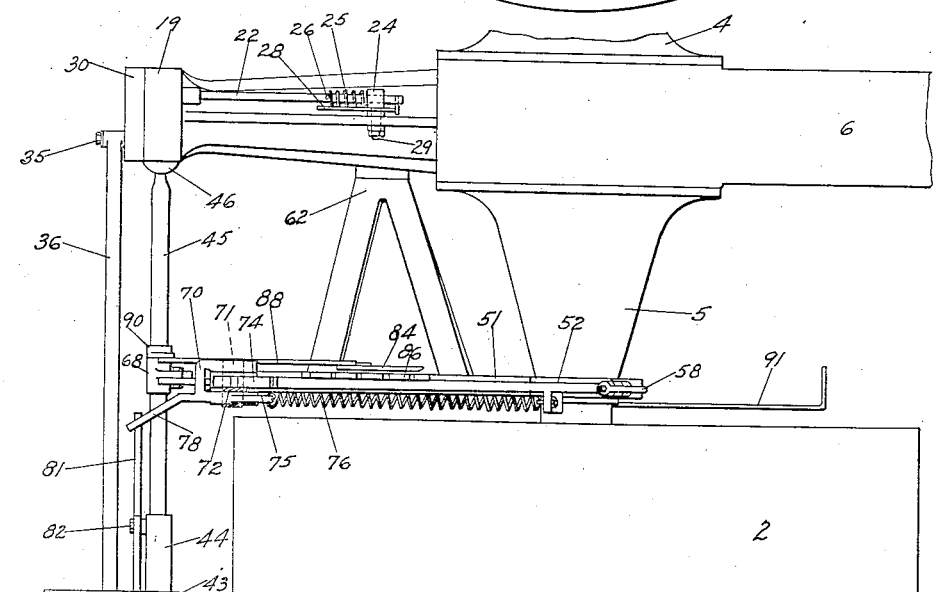
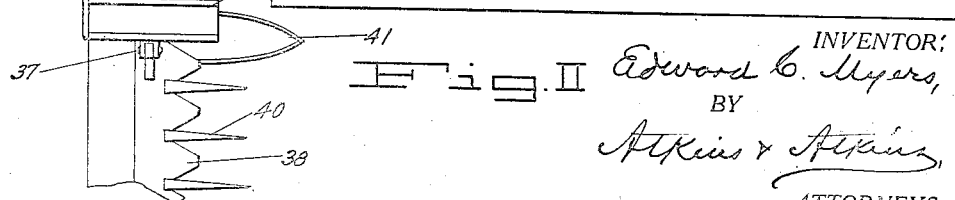
Fig. II
INVENTOR:
Edward C. Myers,
BY
Atkins & Atkins,
ATTORNEYS.

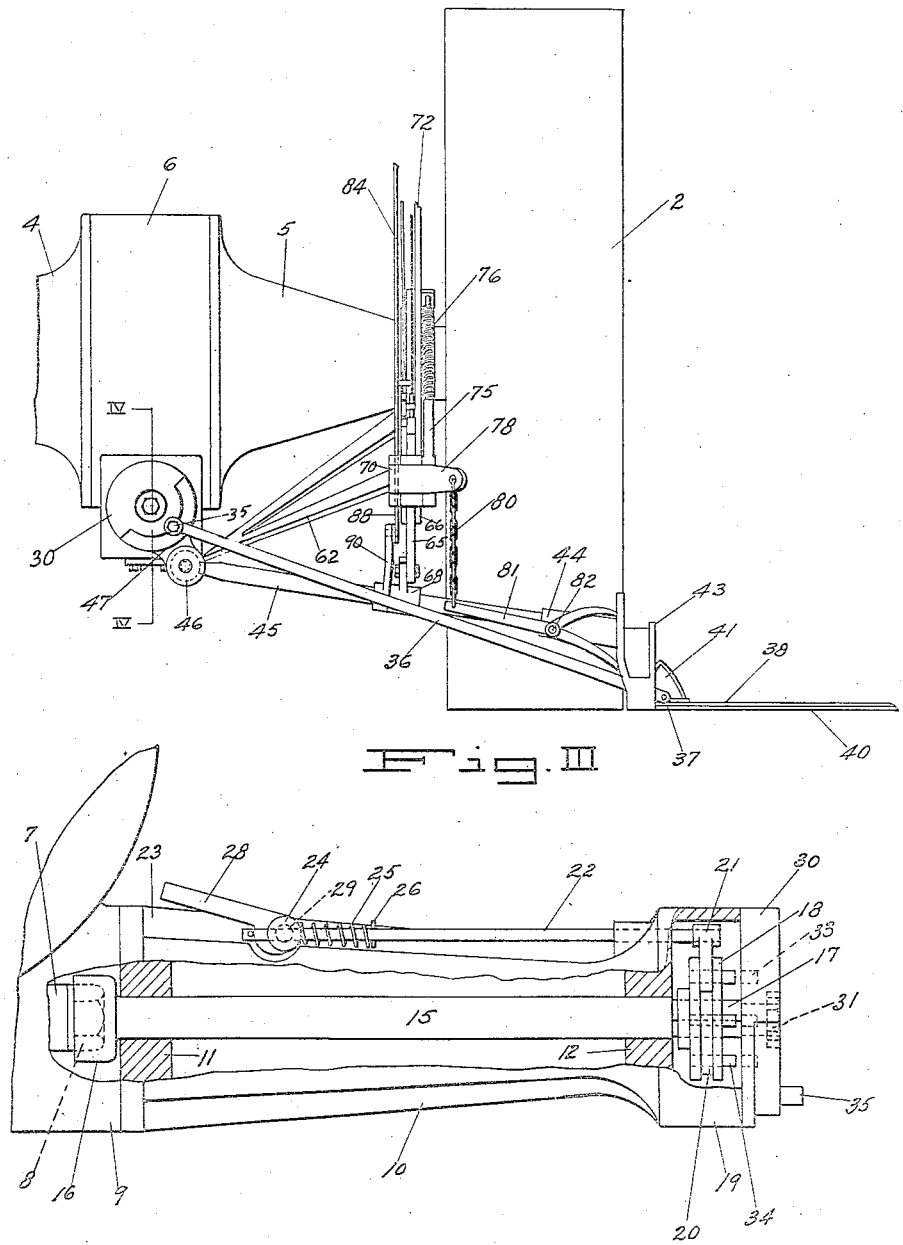

Patented Dec. 10, 1929

1,739,323

UNITED STATES PATENT OFFICE

EDWARD C. MYERS, OF PORTLAND, OREGON

MOWING MACHINE

Application filed December 27, 1920. Serial No. 433,186.

My invention relates to mowing machines, and has for its main object the production of a mowing machine through the employment of an attachment which may at will be easily, conveniently, and expeditiously applied to or removed from a tractor, by such means as will not in anywise, when not in use, impair the usefulness of the tractor for other purposes.

Among the objects of my invention may be specified economy, simplicity, and stability of construction of the machine, as well as means for facilitating its operation in service.

What constitutes my invention will be hereinafter described in detail and succinctly set forth in the appended claims.

In the accompanying drawings,

Figure I is a side elevation, partly in vertical section, of a portion of a machine, showing my invention in present preferred form of embodiment.

Figure II is a top plan view of those parts of the machine, as indicated in Figure I, that are material to my invention.

Figure III is an end elevation of the subject matter of Figure II.

Figure IV is a longitudinal vertical section, partly in elevation, of a portion of the subject matter of Figure III, indicated by the line IV—IV in that figure.

Referring to the numerals on the drawings, 1 and 2 indicate the driving wheels of a tractor, 3 the axle thereof, by which they are driven, and 4 and 5 the tapered end pieces of the axle case bolted or otherwise secured to opposite sides, respectively, of the body 6 of the tractor.

The form of tractor illustrated is of a well known type, which, however, is used by way of example only to represent a tractor of any suitable kind.

In Figure IV, is indicated at 7 the end of an engine shaft which derives rotation from the engine, not illustrated, and communicates the same to the axle 3 to drive the wheels 1 and 2, and which, in the form of tractor shown, terminates in a nut 8.

To the end of a housing 9 for the end of the shaft 7 is bolted or otherwise secured a hollow extension shaft case 10, provided with transverse terminal bearing walls 11 and 12, within suitable bearings in which is carried in coaxial relationship to the engine shaft 7 an extension shaft 15, coupled to the shaft 7 as by a cap 16 that receives the nut 8 with snug fit. Outside of the wall 12, the extension shaft 15 is prolonged, as indicated at 17, for the accommodation with sliding movement longitudinally thereupon of a clutch member 18 housed in a bowl 19 on the end of the case 10. That portion of the shaft 15 which carries the member 18 may be squared to fit a corresponding aperture in the member 18, but any suitable means for securing those parts irrevolubly together with provision for longitudinal movement of one upon the other may be employed. The cylindrical periphery of the member 18 is provided with an annular groove 20, which receives a finger 21 that projects laterally from a rod 22 to whose adjacent end it is fixed. The rod 22 works reciprocally in a bearing provided for it through the wall 12, and it extends on the outside of the case 10, preferably alongside a longitudinally disposed fin 23 provided thereon. To the fin 23 is pivoted a laterally projecting head 24 through an aperture in which the rod 22 passes. A coiled spring 25 about the rod 22, seated at one end against the head 24 and at the other against a cross pin 26 in the rod 22, serves to normally project the rod in the direction of the member 18, with the effect of driving that member, through engagement therewith of the finger 21, in the same direction. A swinging lever 28, hinged on the pin 29 which supports the head 24, and having a fulcrum connection with the end of the rod 22 that projects beyond the head 24 serves to retract the rod 22 and with it the member 18 against the yielding force of the spring 25.

Beyond the member 18, the shaft extension 15 carries a crank head 30 that is secured revolubly to the member 15, whose end is threaded to a nut 31 that secures the crank head. The crank head rotates snugly against the edge of the bowl 19 and is provided on the inside with a series of holes 33 disposed to receive pins 34 that project beyond the face of the clutch member 18, whereby it is constituted a complementary clutch member to the member 18, with which it normally engages under impulse of the spring 25.

The said crank head carries upon its outer face a crank pin 35 to which is pivotally secured one end of a pitman 36 whose opposite end is pivoted, as indicated at 37, to a cutter bar 38 of usual or preferred form that works reciprocally in any usual or suitable and preferred manner in a finger bar 40.

The finger bar 40 is preferably supported at its inner end by a shoe 41 that is provided with an arch 43 having a socket piece 44 by which it is connected through an arm 45 and a universal or ball joint 46 to a bracket 47 projecting from the lower side of the case 10. By reason of the presence of the joint 46 the finger bar and cutter bar may ride in the usual manner upon the shoe 41 over inequalities and variations of the ground and at the same time maintain operative relationship to the pitman 36. Except for the means of accommodation of the arm 45 and the pitman 36 to their cooperative elements, respectively, the members of the mowing mechanism may be of any well known or suitable type preferred.

In order to accommodate the customary or preferred assemblage of levers necessary to adapt the cutter bar and the finger bar to the performance of their work, a suitable rigid support must be provided within convenient reach of the driver's seat 50. To that end, I provide a bar 51, preferably made of sufficient width to give it ample stiffness, and anchored at one end to the axle case, for example, the end piece 5 thereof, as by means of a suitable split collar. The split collar shown in the drawings, by way of example, includes a fixed part 52 made integral with the bar 51 and shaped to fit the outside of the end piece 5 to which it is clamped by a movable part or lip 53 hinged to the part 52 as indicated at 55. Said members 52 and 53 are provided with split projections 56 and 57, respectively, which are drawn towards each other when the split collar is fastened about the axle case, as shown clearly in Figure I, by the action of a handled nut 58 threaded to the end of a link pin 60. The link pin 60 is hinged at 61 between the parts of the lower projection 57, for instance, so as to swing the nut 58 into or out of engagement with the other projection 56 which is, as described, split to receive the pin 60. A partial turn of the handle of the nut 58 suffices to fasten together or to liberate the projections 56 and 57 whenever it is desired to attach or detach the bar 51. The free end of the bar 51 is, in use, supported with requisite rigidity by a preferably bifurcated strut 62, whose single end is secured to the lower side of the case 10, as by tap bolts 63.

Referring now to that assemblage of levers that is presented by way of example of such means of manipulative control of the parts of the mowing mechanism as may be preferred for the purpose, 65 indicates a preferably longitudinally extensible arm pivoted at one end as indicated at 66 to a stud 67 pendent from the bar 51, and pivoted at the other end, as by a sleeve 68, to the arm 45, in order to relieve strain on said arm without impairing in any wise its freedom of movement.

A compound bell crank lever 70 secured to a rock-shaft 71 mounted in bearings on the bar 51, and subject to manual control by aid of a hand lever 72 carrying usual latch mechanism 73 cooperative with a ratched quadrant 74 on the bar 51 is illustrated for lifting the free end of arm 45 as occasion may require. The lever 70 includes an arm 75 which is connected by a tensile spring 76 to a stud 77 near the fixed end of the bar 51, so as to contribute a yielding uplift to another arm 78, linked, as by a chain 80, to a usual tilting lever 81, pivoted as indicated at 82 to the socket piece 44, and adapted to impart both lifting and tilting motion to the arch 43. A hand lever 84, like the lever 72, and with its latch mechanism 85 cooperating with a notched quadrant 86 on the bar 51, is mounted on a shaft 87 and imparts motion through a link 88 to a crank arm 90 fixed to the arm 45, for the purpose of imparting rocking movement to said arm for regulating the upturn or downturn of the shoe 41 and of the cutter bar and finger bar whose operation it directs.

A foot lever 91 is provided as alternative means for operating the lever 70 independently of the hand lever 72.

Briefly described, the operative efficiency of my invention is found partly in the facility with which the parts of the device may be assembled and disassembled, and partly in the completeness of the functionating of the machine as a whole.

In respect to the first named feature, all that is necessary to the application of the mowing mechanism to a tractor equipped with the case 10 and its contained parts, is to apply the parts 52 and 53 of the split collar to the end piece 5 and afterwards the single end of the strut 62, to the under side of the case 10. Then, upon simple upturn of the link pin 60 followed by twist of the nut 58, it is necessary only to set the tap bolts 63 and shift the lever 28, when the work of assembling is done. The time necessary for its accomplishment is at most almost a negligible quantity. It need take only a few moments, depending upon the manipulative skill of the operator. The reverse of the operation described effects the removal of the mowing mechanism and leaves the tractor ready for service in its ordinary capacity.

In respect to the operation of the fully assembled machine, the operator upon the driver's seat 50 controls the tractor by manipulation in the ordinary manner of the usual means, and manipulates the levers 72, 84, and 91, as occasion requires precisely in the same manner as they are manipulated in ordinary mowing machines. The mowing mechanism is applied to and comes away from the tractor as a unit, and when removed therefrom leaves the tractor unencumbered of any superfluous mechanism, the case 10 being no more than an unobtrusive rearward elongation of the body 6, without any operative activity.

What I claim is:

1. In a mowing machine, the combination with a tractor, including an axle case and its engine shaft, of mowing mechanism, including a reciprocatory cutter bar fastened to the axle case and disposed rearwardly thereof, and mechanism operatively connecting the engine shaft and the cutter bar.

2. In a mowing machine, the combination with a tractor, including an axle case and its rearwardly extending engine shaft, of an extension shaft coupled to the end of the engine shaft, a case therefor, a crank head at the end of the extension shaft case in operative connection with the extension shaft, and mowing mechanism secured to the axle case, including a reciprocatory cutter bar and means operatively connecting the crank head and cutter bar.

3. In a mowing machine, the combination with a tractor, including an axle case and its rearwardly extending engine shaft, of an extension shaft coupled to the end of the engine shaft, a case therefor, a crank head revolubly fastened to the end of the extension shaft, a clutch member therefor slidingly but irrevolubly carried on the extension shaft, means for throwing the clutch member into and out of engagement with the crank head, and mowing mechanism including a cutter bar operatively connected with the crank head.

4. The combination with a tractor, including a body and an engine shaft, a rearward extension shaft, an extension shaft case, and a crank head at the end of the shaft case in operative connection with the extension shaft, of an arm, a universal joint connecting the arm and shaft case, a cutter bar carried by the arm, means for operating the arm in its joint, and means operatively connecting the crank head and cutter bar.

5. The combination with a tractor, including a body and an engine shaft, a rearward extension shaft, an extension shaft case, and a crank head at the end of the shaft case in operative connection with the extension shaft, of an arm, a universal joint connecting the arm and shaft case, a cutter bar carried by the arm, means for operating the arm in its joint, means operatively connecting the crank head and cutter bar, a bar operatively supporting said arm and the means for operating it and for detachably connecting it to the tractor body, and a strut supporting the bar upon the shaft case.

6. A tractor adapted to combine with detachable mowing mechanism, comprising the combination with its body and engine shaft, of a rearwardly disposed extension shaft coupled to the engine shaft, an extension shaft case on the body, a crank head operatively connected with the extension shaft, and means for disconnecting at will the crank head and extension shaft.

7. A tractor adapted to combine with detachable mowing mechanism, comprising the combination with its body and engine shaft, of a rearwardly disposed extension shaft coupled to the engine shaft, an extension shaft case on the body, a crank head rotatably mounted on the extension shaft, a clutch member complementary to the crank head irrevolubly but slidingly mounted on the extension shaft in operative proximity to the crank head, and means for sliding the clutch member into and out of clutch with the crank head.

8. The combination with a tractor, comprising a body, an axle case, an engine shaft, an extension shaft, and an extension shaft case, of a bar, mowing mechanism carried thereon, a split collar on the bar, means for detachably fastening said collar to the axle case, and a strut operatively supporting said bar upon the extension shaft.

9. A mowing machine having means for fastening it to and supporting it by the rear axle and differential housing of a tractor.

10. A mowing machine having means for fastening it to and supporting it by the rear axle and differential housing of a tractor so as to extend rearwardly thereof.

11. A mowing machine carried on a frame structure having means for fastening it to and supporting it by the rear axle and differential housing of a tractor, and control mechanism for the mowing machine mounted on said frame structure.

12. A mowing machine and control mechanism therefor mounted on a frame structure and means for attaching the same to the rear axle and differential housing of a tractor.

13. A mowing machine and control mechanism therefor mounted on a frame structure, means for attaching the same to the rear axle and differential housing of a tractor, and means for connecting the tractor power plant for operating the mowing machine.

14. A mowing machine and control mechanism therefor mounted on a frame structure, a clamp on the frame structure for engaging the rear axle housing of a tractor, and a casing forming a part of said frame structure having means for securing it to the differential housing of the tractor.

15. A mowing machine and control mechanism therefor mounted on a frame structure, a clamp on the frame structure adapted to engage the rear axle housing of a tractor, a casing forming a part of said frame structure having means for securing it to the differential housing of the tractor to extend rearwardly thereof, and an extension shaft within said casing having means for connecting it with the tractor drive shaft and with the mowing machine.

16. A mowing machine having means for fastening it to and supporting it by the rear axle and differential housing of a tractor, including a frame for carrying the same and operating mechanism therefor, and means for fastening said mechanism to the differential housing in place of the tractor draw bar cap and to the rear axle housing of the tractor.

17. A frame structure for supporting a mowing machine on a tractor including a frame having means for fastening it to the rear axle housing, and a casing attached thereto having means for securing it to the differential housing so as to extend rearwardly thereof.

18. A frame structure for supporting a mowing machine on a tractor including a frame having means for fastening it to the rear axle housing, a casing attached thereto having means for securing it to the differential housing so as to extend rearwardly thereof, and control mechanism for the mowing machine mounted on said frame structure.

19. A frame structure for supporting a mowing machine on a tractor including a frame having means for fastening it to the rear axle housing of the tractor, a casing attached thereto having means for securing it to the differential housing so as to extend rearwardly thereof, and an extension shaft within said casing having means for connecting it with the tractor drive shaft to actuate cutting mechanism of the mowing machine carried by the frame structure.

20. A shaft casing having means for securing it to the differential housing of a tractor and to extend rearwardly thereof, a shaft extending through said casing having means for connecting one end thereof with the power drive shaft of the tractor, and means on the other end of said shaft projecting from the casing for transmitting power from the tractor drive shaft to machinery adapted to be coupled therewith.

21. A shaft casing having means for securing it to the differential housing of a tractor so as to extend rearwardly thereof, a shaft extending through said casing having means for connecting one end thereof with the power drive shaft of the tractor, means on the other end of said shaft projecting from the casing for transmitting power from the tractor drive shaft, a frame having means for connecting it with said casing and with the rear axle housing of the tractor, a mowing machine supported by said frame, and means for coupling the mowing machine with the power transmitting means on the end of the shaft projecting from the casing.

22. A casing having means for fastening it to the differential housing of a tractor so as to extend rearwardly thereof, a bar having means for ancoring it to the rear axle housing of the tractor to extend rearwardly thereof, and an arm having connections with the rear ends of said casing and bar for supporting the same as a drag bar.

23. A casing having means for fastening it to the differential housing of a tractor so as to extend rearwardly thereof, a bar having means for ancoring it to the rear axle housing of the tractor to extend rearwardly thereof, a strut having connections with the casing and said bar, and an arm having connections with the rear ends of said casing and bar for supporting the same as a drag bar for operating an implement carried thereby.

24. A casing having means for fastening it to the differential housing of a tractor so as to extend rearwardly thereof, a bar having means for ancoring it to the rear axle housing of the tractor to extend rearwardly thereof, an arm having connections with the rear ends of said casing and bar for supporting the same as a drag bar, a mowing machine connected with said arm, and control mechanism for said mowing machine mounted on said bar.

25. A casing having means for fastening it to the differential housing of a tractor so as to extend rearwardly thereof, a bar having means for ancoring it to the rear axle housing of the tractor to extend rearwardly thereof, an arm having connections with the rear ends of said casing and bar for supporting the same as a drag bar, a mowing machine connected with said arm, and a driving shaft in said casing having connections with the tractor power plant and said mower for driving the same.

26. A bar having means for ancoring it to the rear axle housing of a tractor, a drag bar having connections with the first said bar for carrying an operating implement, control apparatus for the operating implement carried by the drag bar, and means for operating said implement.

27. A drive shaft housing having means for securing one end thereof to the differential housing of a tractor, a shaft within said housing, means at one end of the housing affording a driving connection for the shaft from the power drive shaft of the tractor, a driving member on said shaft at the outer end of the housing, a clutch member on said shaft within the housing, and means for operating said clutch for connecting and disconnecting the drive between the power drive shaft and said driving member.

28. In combination with a tractor having a rear axle and differential housing, and a power drive shaft therein driven by the tractor engine having a driving connection with the tractor differential rear axle drive, a casing having means for connecting it with the differential housing so as to extend beyond said power drive shaft, a driving member adapted to be driven from said power drive shaft, and a shaft in said casing having a driving connection with the power drive shaft at one end and said driving member at its other end.

29. In combination with a tractor having a rear axle and differential housing and a power drive shaft therein driven by the tractor engine having a driving connection with the tractor differential rear axle drive, a casing having means for connecting it with the differential housing so as to extend beyond said power drive shaft, a shaft in said casing, a driving member at the outer end of said shaft, a clutch member on said shaft, and means for operating said clutch for connecting the drive between the power drive shaft and said driving member.

30. In a mowing machine including a cutter bar and finger bar, an arm having one of its ends connected with said members for supporting them, a pivoted joint at the other end of said arm for its connection with a vehicle, means connected with said arm between its ends for supporting and raising the end of the arm carrying the aforesaid members of the mowing machine, and means for reciprocating the cutter bar of the moving machine.

31. In a mowing machine including a cutter bar and finger bar, an arm having one of its ends connected with an end of the finger bar for supporting said members, means for supporting the arm between its ends, a pivotal support at the other end of said arm for connecting it with a vehicle, means for permitting movement of the outer end of said arm forwardly and rearwardly with respect to its pivoted support, and means for operating the cutter bar of the mowing machine.

32. A drive shaft housing having means for securing one end thereof to the differential housing of a tractor, a shaft within said housing, a driving member on said shaft at the outer end of the housing, a clutch member on said shaft within the housing, and means for operating said clutch for connecting and disconnecting the drive between the power drive shaft of the tractor and said driving member.

In testimony whereof, I have hereunto set my hand.

EDWARD C. MYERS.